United States Patent [19]

Brolin

[11] 3,899,754

[45] Aug. 12, 1975

[54] DELTA MODULATION AND DEMODULATION WITH SYLLABIC COMPANDING

[75] Inventor: Stephen Joseph Brolin, Livingston, N.J.

[73] Assignee: Bell Telephone Laboratories, Incorporated, Murray Hill, N.J.

[22] Filed: May 9, 1974

[21] Appl. No.: 468,449

[52] U.S. Cl. .......... 332/11 D; 325/38 B

[51] Int. Cl.² .......... H03K 13/22

[58] Field of Search .......... 332/11 R, 11 D; 325/38 R, 325/38 B

[56] References Cited

UNITED STATES PATENTS

| | | | |
|---|---|---|---|
| 3,582,784 | 6/1971 | Gaunt | 332/11 D X |
| 3,624,558 | 11/1971 | Brolin | 332/11 D |
| 3,716,803 | 2/1973 | Candy | 332/11 D |
| 3,815,033 | 6/1974 | Tewksbury | 332/11 D X |

OTHER PUBLICATIONS

Schindler - "Delta Coder" - IBM Tech. Disclosure Bulletin, Vol. 13, No. 8, Jan. 1971, p. 2375.

*Primary Examiner*—Alfred L. Brody
*Attorney, Agent, or Firm*—R. O. Nimtz

[57] ABSTRACT

A delta modulator and demodulator are shown using double integration in the audio feedback loop and including a separate feedback loop for direct current offset compensation. The output bit pattern is analyzed to detect when an increase in companding step-size is required. When required, a companding control voltage is generated and integrated at a syllabic rate. This syllabic integrator has a decay circuit providing a decay time approximately three times the attack time, thus insuring good voice tracking, acceptable noise trailoff, and at the same time causing exponential decay of digital errors at a syllabic rate. The companding control voltage is applied to a nonlinear current step generator simulating a logarithmic characteristic by piecewise linear current segments. Temperature-compensated transistor circuits are used in the step generator. Impedance isolation, combined with staged temperature compensation, provides stable and reproducible nonlinear current characteristics with standard integrated circuits.

13 Claims, 5 Drawing Figures

DELTA ENCODER

DELTA DECODER

DELTA DEMODULATOR

DELTA MODULATION AND DEMODULATION WITH SYLLABIC COMPANDING

BACKGROUND OF THE INVENTION

1. Field of the Invention

This invention relates to the encoding of analog signals into digital signals and the decoding of said signals and, more particularly, to companded delta modulation and demodulation.

2. Description of the Prior Art

It is well known that pulse signals can be transmitted over longer distances without loss of information provided only that the pulses are regenerated at suitable intervals. It has become increasingly common therefore to encode analog signals in a digital format prior to transmission.

One such encoding technique has been termed delta modulation and is based on the technique of comparing an input signal to a signal reconstituted from the output pulses. An output ONE is generated at clock intervals when the input signal exceeds the reconstituted signal; otherwise a ZERO is generated. The output pulses are integrated to form the reconstituted signal which forms the basis for generating the difference (delta) signal.

One of the major difficulties with delta modulation schemes is the difficulty of tracking rapidly changing input signals and, at the same time, accurately tracking slowly changing signals. A single stepsize for each output pulse cannot accommodate both accuracy with slowly changing signals and tracking with rapidly changing signals. The soluion to this problem is to insert a nonlinear companding characteristic in the stepsize of the pulses fed back to the integrator. "Companding" here means to compress the signal amplitude at transmission and to expand the signal a compensating amount at reception. This problem and several solutions have been described in an article entitled "Code Modulation With Digitally Controlled Companding for Speech Transmission" by J. A. Greefkes and K. Riemens, appearing in the *Phillips Technical Review*, Volume 31, No. 11/12, 1970 at pages 335–353.

Some of the problems still remaining in a companding delta modulator is the diffficulty of accurately reproducing the nonlinear companding characteristic at both the transmitting and receiving end of the system and of making these characteristics insensitive to temperature variations, aging and selection of components. Another problem with prior art systems is the tendency to accumulate digital errors either in the terminal equipment or in the transmission system in which it is used. Even in systems with low error rates, these errors can become troublesome if they are cumulative.

SUMMARY OF THE INVENTION

In accordance with the present invention, to improve the tracking of speech signals in a companding delta modulator, the compander control voltage is derived from an integrator having a charging time constant of the same order as the attack time of speech syllables and having a different relaxation time constant on the order of the decay time of spoken syllables.

In further accord with the present invention, a nonlinear companding characteristic is provided for the delta modulator by simulating a logarithmic characteristic with a plurality of piecewise linear current characteristics of temperature-compensated transistors. These transistors are arranged in stages, the second stage of which is impedance isolated to provide a more reasonable impedance level at the input.

More particularly, a plurality of transistors with predetermined turn-on thresholds have their collectors connected together to provide the step currents. A companding control voltage is applied directly to the bases of the first stage of these transistors while controlling voltages are derived for the second stage of these transistors from the emitters of the first set, operating in the emitter follower configuration. In parallel with the first stage of transistors is a temperature-compensating junction. A second temperature-compensating junction is placed in parallel with the second stage of current generators. These junctions are preferably integrated circuit junctions fabricated on the same chip as the current generating transistors and thus have matching characteristics.

These and other features of the invention will be more readily appreciated upon consideration of the attached drawings and of the following detailed description of the drawings.

DETAILED DESCRIPTION

Figure 1:
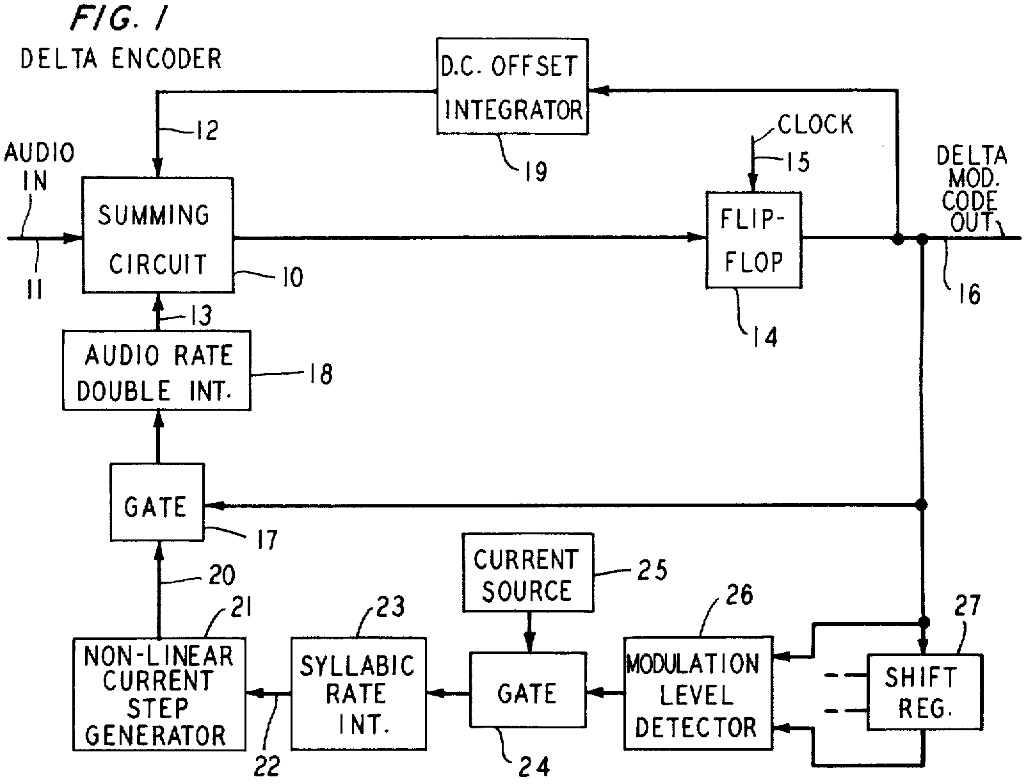
FIG. 1 is a general block diagram of a companding delta encoder in accordance with the present invention.

In FIG. 1 there is shown a general block diagram of the delta modulator. The delta modulator of FIG. 1 comprises a summing circuit 10 to which there is applied an input signal on lead 11 and two feedback signals on leads 12 and 13. Summing circuit 10 derives the algebraic sum of these three signals and sets flip-flop 14 to a ONE state if this output is positive and sets flip-flop 14 to a ZERO state if this sum is negative. Flip-flop 14 is permitted to change state only in the presence of a clock pulse which thus determines the sampling rate. The output of flip-flop 14 from lead 16 comprises the digitally encoded representation of the input signal on lead 11.

As is well known, the output signal from flip-flop 14 is fed back to a gate circuit 17 which gates current to an integrating circuit 18. The output of integrator 18 on lead 13 forms a representation of the input signal on lead 11 as encoded by the pulses on lead 16 and this reconstituted signal is compared to the input signal by summing circuit 10.

As is well known, the output pulses on lead 16 are also applied to a direct current offset integrator 19 having a very long time constant in comparison to changes in the signal being encoded. The output of integrator 19 is applied by way of lead 12 to summing circuit 10 to compensate for any direct current offsets which may exist in the input signal on lead 11 or which may be generated in the encoding process in the remainder of FIG. 1. The time constant of integrator 19 is many times longer than any of the operations taking place in FIG. 1 and thus these operations are not affected in any significant way by offset integrator 19.

The accuracy with which the encoder of FIG. 1 can track the input signal depends directly on the charging current signals applied to gate 17 on lead 20. In accordance with the present invention, these currents are supplied from a nonlinear current step generator 21 which provides a current step for integration which is dependent upon the rate of change of the input signal. To this end, step generator 21 has a nonlinear characteristic closely approximating a logarithmic characteristic shown by the curve in FIG. 2.

The step generator 21 is under the control of control voltage on lead 22. The control voltage on lead 22, in turn, is derived from a syllabic rate integrator 23. Integrator 23 provides a control voltage which is responsive to the rate of change of the input signal but at the same time is constrained to increase at approximately syllabic attack rates and is permitted to decay only approximately at syllabic decay rates. In this way, companding is made syllabic rather than instantaneous and thus the encoder of FIG. 1 is better able to encode speech signals. Rather than merely integrate at syllabic rates, however, different charging and discharging times are provided for this integrator to permit faster tracking of abrupt syllable beginnings and at the same time to permit a slowly decaying companding characteristic for syllable endings which decay more slowly in normal human speech. The compander is thus arranged to follow the envelope of normal speech and, at the same time, to take advantage of the listener's tolerance of noise at syllabic endings.

Integrator 23 is supplied with current pulses by gate 24 from current source 25. Gate 24, in turn, is operated by modulation level detector 26 which analyzes the level of modulation reached by the output pulse train on lead 16. These pulses are stored in shift register 27 and presented in parallel to detector 26. Detector 26 determines when the delta encoder is not tracking the input signal sufficiently closely. This is most simply accomplished by noting that an extended sequence of similar signals (either ONEs or ZEROs) are being transmitted by the encoder.

Figure 3:
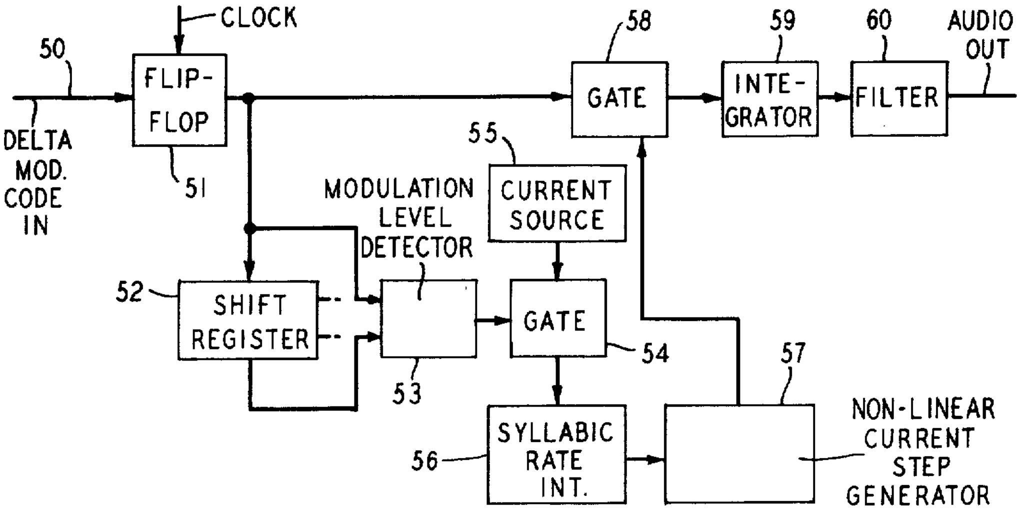
FIG. 3 is a block diagram of a decoder for the companded delta modulated signals generated in the encoder of FIG. 1.

In FIG. 3 there is shown a delta decoder suitable for decoding the delta modulated pulse stream generated in the encoder of FIG. 1. In FIG. 3 these codes appear on lead 50 and are applied to a clocked flip-flop 51. A series of these received pulses are stored in shift register 52 and analyzed by modulation level detector 53. Shift register 52 and modulation level detector 53 may be identical to the corresponding elements in FIG. 1 and perform an identical function. That is, shift register 52 stores the most recently received sequence of encoded pulses and detector 53 detects long sequences of similar signals. When such a sequence is received, detector 53 operates gate 54 to apply a pulse of current from current source 55 to syllabic rate integrator 56.

Integrator 56 is identical to integrator 23 and provides syllabic rate integration with unequal attack and decay times related directly to both the attack and decay times of the syllables of human speech and also to the response of the ear to speech. The output of integrator 56 is supplied to nonlinear current step generator 57 which, like generator 21 in FIG. 1, has a logarithmic characteristic. Step generator 57 supplied current pulses to gate 58 whidh, when operated by pulse signals from flip-flop 51, supplies these current pulses to integrator 59. Integrator 59 develops an analog signal which represents the decoded delta modulated pulses and, after filtering in lowpass filter 60, comprises the analog output of the encoding system.

One advantage of the syllabic rate integrators 23 (FIG. 1) and 56 (FIG. 3) is that errors at the terminals or errors of transmission which cause erroneous decoding are quickly forgotten by the system due to the decay of the control voltage on the syllabic integrator. This tendency is not dependent on the transmitted pulse pattern and thus continues to operate independently of the encoding process. This built-in companding decay prevents errors from becoming cumulative since all signals and hence all errors are forgotten at a near syllabic rate.

Figure 4:
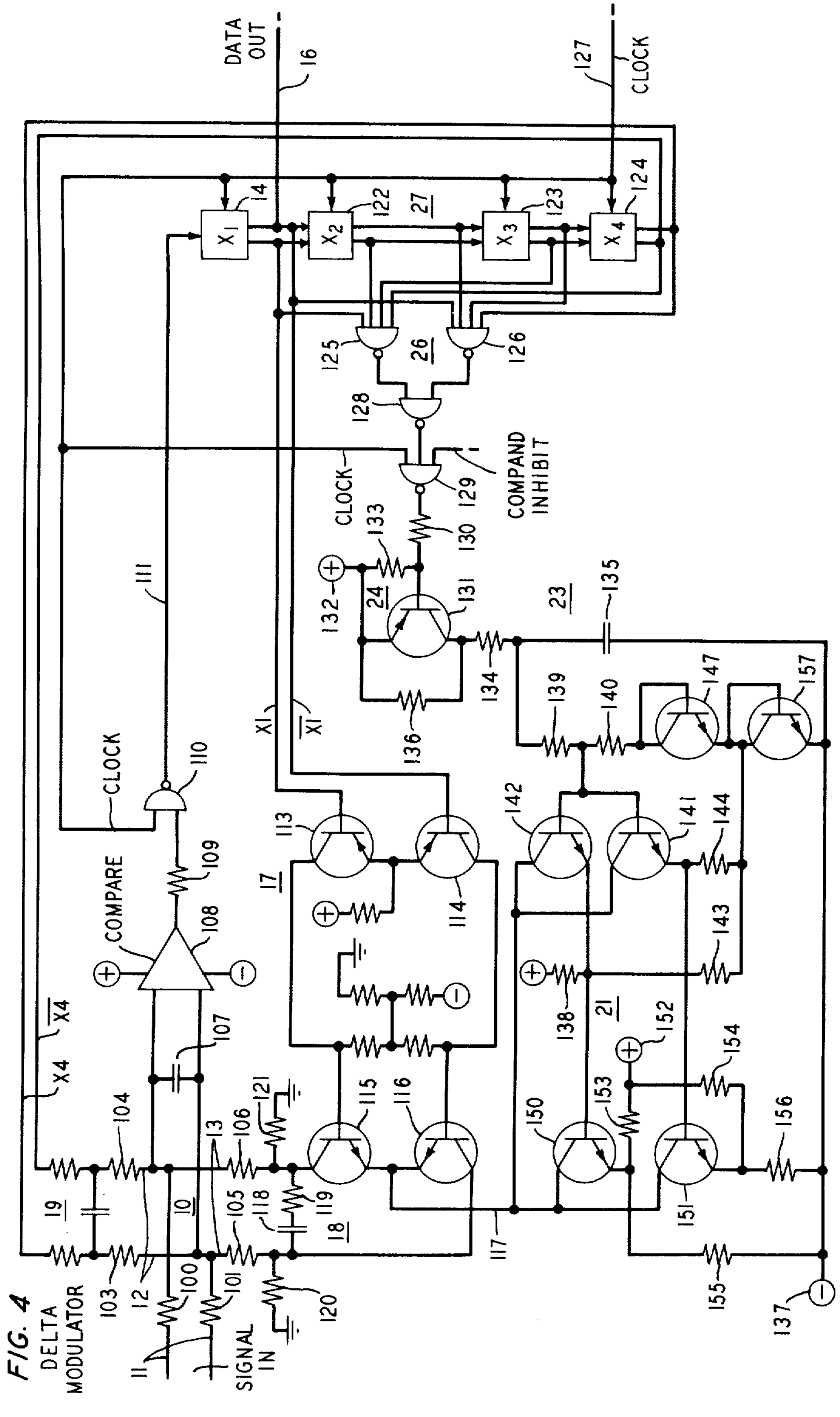
FIG. 4 is a detailed circuit diagram of the delta encoder of FIG. 1.

Referring more particularly to FIG. 4, there is shown a detailed circuit diagram of the delta modulator shown in block form in FIG. 1. The delta modulator of FIG. 4 comprises an input summing circuit 10 including summing resistors 100 and 101 in the audio signal input lines 11. Summing resistors 103 and 104 are located in the direct current offset integrator feedback path 12 and the summing resistors 105 and 106 are located in the reconstructed signal feedback path 13.

The direct current offset integrator 19 and the audio reconstruction integrator 18 are each double integration circuits which share output capacitor 107, connected across a compare circuit 108. Compare circuit 108 is an operational amplifier having the property of producing an output signal in one of two logical states depending on the polarity of the input signal. Compare circuit 108, sometimes called a "bang-bang" circuit, converts small analog differences at its input leads into digital output signals. Such circuits are well known and compare circuit 108 might comprise, for example, a Dual Differential Comparator available from Texas Instruments, Inc. as the SN72711.

The output of compare circuit 108 is applied through a current limiting resistor 109 to a logical NAND gate 110. NAND gate 110 serves to clock the output of compare circuit 108 and thus serves as a sampling gate which provides a delta modulated pulse stream on lead 111. These pulses are stored in flip-flop 14 from which they are gated to data output lead 16.

It will be noted that those portions of FIG. 4 which correspond to elements of FIG. 1 of the drawings have been identified by the same reference numerals. Thus feedback paths 12 and 13, input leads 11 and flip-flop 14 correspond to the similarly identified elements of FIG. 1.

There has thus far been described the basic constituents of a delta modulated circuit by means of which a stream of binary pulses are generated in response to a comparison of the input signal and a signal reconstructed from the output pulse steam. The balance of FIG. 4 shows in detail the particular manner in which the reconstructed signal is generated in accordance with the present invention. As can be seen from FIG. 4, the presence or absence of an output pulse as registered in flip-flop 14 is used as the control signal (X1 and $\overline{\mathbf{X1}}$) to operate gate 17 and apply a selected pulse of current to integrator 18.

Gate 17 comprises a pair of input transistors 113 and 114 operated as switches by signals on their bases. Either one or the other of transistors 113 and 114 is always operated, depending on the state of flip-flop 14.

Transistors 113 and 114, in turn, provide control signals to the bases of switching transistors 115 and 116, respectively. A current of a precisely selected magnitude, appearing on lead 117 is applied to the emitters of transistors 115 and 116 which, when operated, supply this current to integrator 18 with a polarity depending on the state of flip-flop 14. Integrator 18 is thus continuously supplied with current pulses; these pulses vary in polarity depending directly on the binary output signals from the modulator.

Integrator 18 comprises an integrating capacitor 118 in series with a resistor 119 across the collectors of transistors 115 and 116. Resistors 120 and 121 provide direct current paths to ground to stabilize the operating points of integrator 18.

It will be noted that resistor 119 is placed in series with capacitor 118 rather than in series with capacitor 107 which is more usual in double integration circuits. The placement of resistor 119 at this point provides an additional zero in the frequency characteristic of the first integrator and a pure capacitor for the second integrator, thus providing noise immunity at the comparator input while maintaining control of loop stability.

The delta modulator of FIG. 4 is a companding modulator, that is, larger current steps are provided by the modulator when tracking input signals with large amplitude excursions while much smaller current pulses are provided for tracking input signals with small amplitude excursions. This characteristic is important in providing a wide dynamic range of response for the modulator. This companding characteristic is particularly important in encoding speech signals where major differences exist between signal levels during uttered speech and the silent intervals which normally occur between uttered syllables, and between shouts and whispers and between loud talkers and soft talkers.

Companding is accomplished by changing the magnitude of the current steps which are integrated in integrator 18 in response to difficulties of tracking the input signal. These difficulties in tracking the input signal are detected by looking at a sequence of output pulses and identifying consecutive sequences of all ONEs or all ZEROs. A sequence of ONEs indicates that the modulator is attempting to construct a replica of the input signal and after a number of tries, has still been unable to build a replica of sufficient magnitude by adding current pulses at the present magnitude. Similarly, a sequence of successive ZEROs indicates that the modulator is attempting to reduce the magnitude of the replicated signal to the instantaneous amplitude at the input signal but is as yet unable to do so with the current steps of the present magnitude.

The condition of all ONEs or all ZEROs is detected by storing a sequence of output pulses in a shift register comprising flip-flops 14, 122, 123 and 124. The ONE outputs of these four flip-flops are applied to NAND gate 125 while the ZERO outputs of these flip-flops are applied to NAND gate 126. These output signals are advanced in the shift register by clock pulses appearing on lead 127 in synchronism with the operation of gate 110.

In the delta modulator of FIG. 4, a four-stage shift register comprising four flip-flops 14, 122, 123 and 124 is shown. This number was selected for convenience and because it met the needs of a particular application. It is obvious, however, that the number of flip-flops and hence the length of the shift register may be extended or contracted to reflect a design choice based on a greater or a fewer number of previously transmitted data pulses. Reducing this number will increase the speed of response of the modulator to sharp changes in input signal levels while at the same time increasing the tendency of the modulator to overshoot. Increasing the length of the shift register, on the other hand, will slow down the rate at which the modulator can respond to changes in input signal amplitude, but at the same time will provide greater stability in this response.

The outputs of flip-flop 124 ($X4$ and $\overline{X4}$) are used to charge direct current offset integrator 19 and thus permit this integrator to track the long term changes in direct current level.

The outputs of NAND gates 125 and 126 are applied to NAND gate 128 the output of which is applied to NAND gate 129. One other input to NAND gate 129 comprises a clock pulse which permits the results of the all ZEROs and all ONEs decision to be sampled only at clock pulse times. A third input to NAND gate 129 comprises a compand inhibiting signal which may be used to inhibit further operation of the companding circuits, while allowing the encoding process to continue.

The output of NAND gate 129 is applied through current limiting resistor 130 to the base of transistor 131. Transistor 131 comprises gate 24 in FIG. 1 and has its emitter connected to a positive voltage source 132. Transistor 131 is normally biased OFF by a biasing current through resistor 133. In the presence of an output from NAND gate 129 on the base of transistor 131, the transistor turns ON to provide a voltage at its collector equal to the magnitude of voltage source 132. This voltage is applied through charging resistor 134 to charge capacitor 135.

The voltage on capacitor 135 comprises a control voltage which controls the magnitude of the current step which is fed back through gate 17 to integrator 18. When transistor 131 does not operate for long periods, a small current is applied from source 132 through resistor 136 and resistor 134 to capacitor 135 to maintain a small charge on capacitor 135. This small charge controls the size of the minimum current step which is available as a feedback current to gate 17. Capacitor 135 is returned to a negative voltage supply 137.

In accordance with the present invention, the value of resistor 134 is selected to permit capacitor 135 to charge at a rate which is on the same order of magnitude as the rate of attack of uttered speech, that is, on the order of 3 milliseconds. Also in accordance with the present invention, a discharge path for capacitor 135 is provided through resistors 139 and 140, the values of which are selected to provide a decay time for the charge stored on capacitor 135 which is on the same order of magnitude as the average decay time for uttered syllables, that is, on the order of 9 milliseconds. These unequal charging and discharging times for control capacitor 135 provide the companding circuit with a dynamic characteristic which is particularly well-suited for the encoding of voice signals. These charging and discharging times serve as major constraints on the dynamic range of the companding characteristic. These constraints force the encoder to operate in a manner well-suited to the tracking of voice signals and yet render it less responsive to impulse noise or other large magnitude, non-voiced signals. At the same time, the discharge circuit for capacitor 135 permits errors in encoding and transmission to be dissipated at syllabic decay rates, thus insuring that errors will not accumulate. This limitation on error propagation is particularly important in delta encoding schemes where the accumulation of errors might otherwise result in long-term distortions of input signals.

As was discussed in connection with FIG. 3, the ideal companding characteristic is a logarithmic relationship between the input and output signals. Such characteristics are extremely difficult to obtain at very low signal levels and thus are difficult to obtain with modern integrated circuit technology. In further accord with the present invention, a logarithmic characteristic is simulated by a series of piecewise linear transistor characteristics which together approximate the overall logarithmic function.

To this end, the control voltage from capacitor 135 is applied by way of the voltage divider comprising resistors 139 and 140 to the bases of transistors 141 and 142. These transistors are biased through resistors 138, 143 and 144, respectively, to provide linear gain in the ranges represented by segments 145 and 146, respectively, in FIG. 2. The tendency of the base-emitter junction impedance to vary with age, temperature and from unit to unit, is compensated for by an identical base-emitter junction in transistor 147 placed in a parallel path with transistors 141 and 142. If transistors 141, 142 and 147 are fabricated together as part of a single integrated circuit, these junctions will automatically have closely matched characteristics and the compensation will be almost totally complete. Minor adjustments can be made by shunting the junctions of transistor 147 with suitably chosen resistances.

Figure 2:
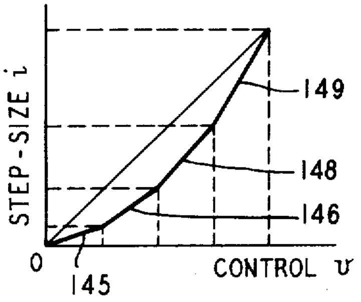
FIG. 2 is a graphical representation of the current-versus-voltage companding characteristic of the encoding circuit of FIG. 1.

Rather than loading the discharge circuit of resistors 139 and 140 with more transistor amplifiers and thus compromising the desired discharge time constant and transmitter-receiver tracking accuracy, the remaining segments 148 and 149 of FIG. 2 are simulated by transistors 150 and 151 the bases of which are connected to the emitters of transistors 142 and 141, respectively. For this purpose, transistors 141 and 142 are operated in a common emitter mode, supplying the control voltage to the bases of transistors 150 and 151 and yet providing no further loading on the discharge circuit. The emitters of transistors 150 and 151 are biased from source 152 through resistors 153 and 154, respectively. These emitters are returned to negative supply 137 through resistors 155 and 156, respectively.

The temperature, age and unit-to-unit sensitivity of the base-emitter junctions of transistors 150 and 151 are compensated by means of the base-emitter junction in transistor 157, also placed in series with the discharge circuit for capacitor 135. It can be seen that the base-emitter junctions of transistors 142 and 150 are connected in series across capacitor 135 and thus both transistors 147 and 157, likewise in series, are necessary to compensate for these junctions. The base-emitter junctions of transistors 141 and 142, on the other hand, require only a single junction for their compensation and thus their emitter circuits are returned to the junction between transistors 147 and 157. Transistor 157 may also be adjusted with suitable shunting resistors.

All of the collectors of transistors 141, 142, 150 and 151 are connected together to line 117 to provide the step current to gate 17 for application to integrator 18. Together these four transistors provide the logarithmic companding characteristic illustrated in FIG. 2.

It will be first noted that the values at the terminals of the straight line segments forming the curve of FIG. 2 are not determined by the characteristics of the semiconductor devices but instead are entirely dependent on the values of the various biasing resistors in the circuitry. If the semiconductor devices are realized in integrated circuit form, these biasing resistors may then comprise highly accurate and easily changeable lumped constant elements connected externally to the integrated circuit. This property further improves the ability of the companding circuit to be independent of age, temperature and component selection. Not only is the direct current tracking of the monolithic circuit junctions improved at low signal levels, but also the alternating current tracking of the circuit between the transmitter and the receiver is likewise improved.

The usual advantages of companding are retained. That is, the speed of response at high levels is not sacrificed to obtain a fineness of control at low signal levels. At the same time, a circuit can be fabricated at low cost, using integrated circuit technology. Reasonable manufacturing reproducibility is possible due to the automatic compensation built into the circuit. Finally, the continual discharge of capacitor 135 forgives transmission errors and improves performance by forcing the modulator to use smaller and smaller steps as time progresses and in the absence of input control signals. The precise shape of the companding curve can be controlled by the selection of the biasing resistors and the number of break-points.

Figure 5:
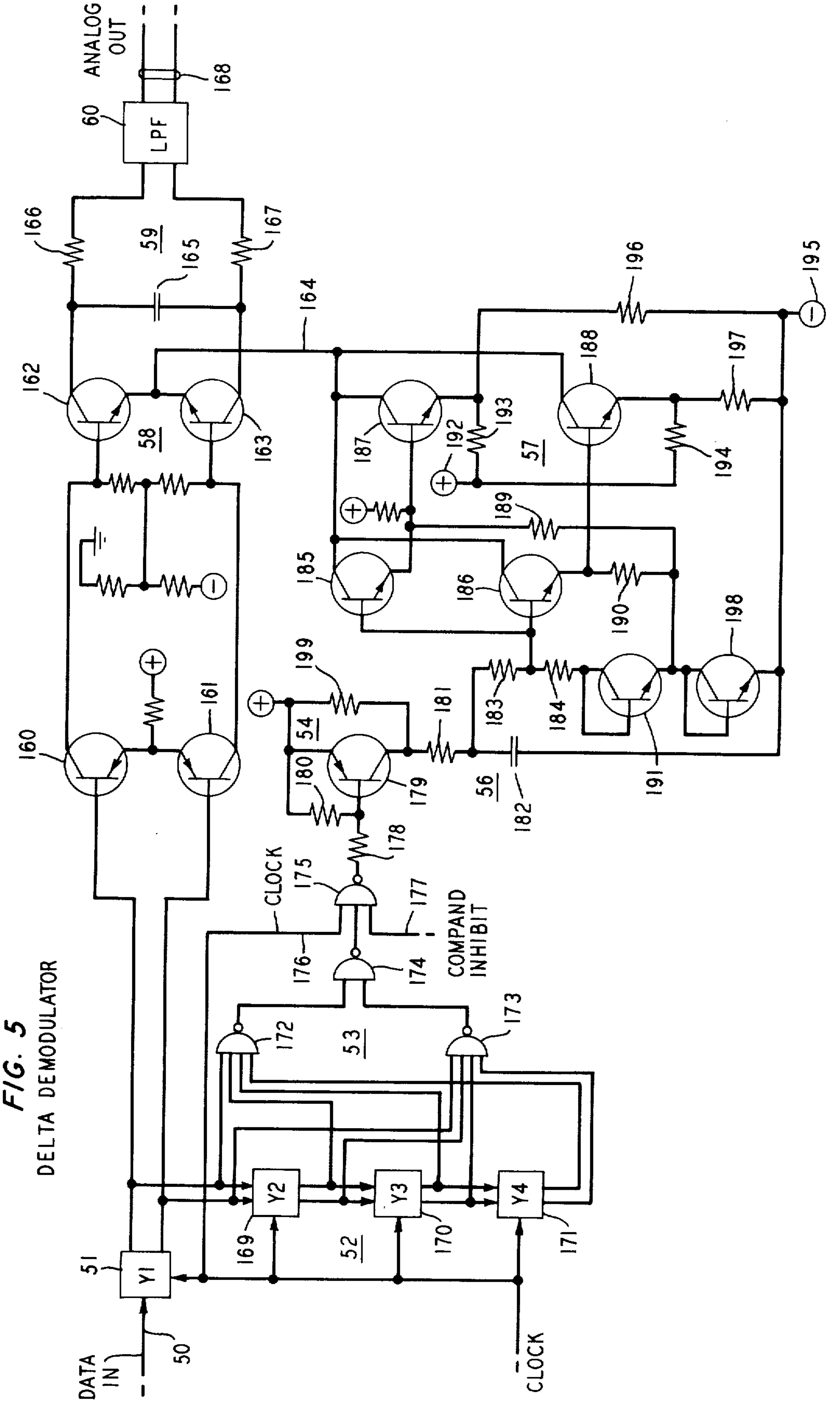
FIG. 5 is a detailed circuit diagram of the decoder circuit of FIG. 3 of the drawings.

Turning then to FIG. 5 of the drawings, there is shown a detailed circuit diagram of a delta demodulator circuit suitable for demodulating the pulse signals generated in the circuit of FIG. 4. The pulse signals appearing on lead 50 are stored in flip-flop 51 and used to control gate circuit 58 which, in turn, applies preselected current pulses to integrator 59. Gate circuit 58 is identical to gate circuit 17 in FIG. 4 and comprises input transistors 160 and 161. The outputs from flip-flop 51 are supplied to the bases of transistors 160 and 161 and determine which of these two transistors is operated. The collectors of these transistors are connected to the bases of switching transistors 162 and 163, respectively. Transistors 162 and 163 are operated in the alternative to supply a current pulse from lead 164 to capacitor 165 of a polarity which depends on which of these two transistors is operated.

By means of this mechanism, information signals such as voice signals are reconstructed on an integrator comprising capacitor 165 and resistors 166 and 167. These signals are delivered to lowpass filter 60. The output from lowpass filter 60, appearing on leads 168, comprises the demodulator output and can be delivered directly to a user.

The circuit for generating current pulses to be used in the reconstruction of the information signal is identical to that shown in FIG. 4. That is, the signals stored in flip-flop 51 are delivered to a shift register 52 comprising flip-flops 51, 169, 170 and 171, the outputs of which are connected to NAND gates 172 and 173. NAND gates 172 and 173 determine the all ONES and all ZEROs condition which are then combined in NAND gate 174 for application to NAND gate 175. Gate 175 is simultaneously under control of clock pulses on lead 176 and a compand inhibit signal on lead 177.

The output of NAND gate 175 is supplied through resistor 178 to gate 54, comprising transistor 179. Transistor 179, biased through resistor 180, supplies current through charging resistor 181 to capacitor 182. Capacitor 182 is charged through resistor 199 when transistor 179 remains in the OFF condition.

Capacitor 182 is charged at a syllabic attack rate through resistor 181 and is discharged at a syllabic decay rate through resistors 183 and 184. The control voltage on capacitor 182 is applied by way of the voltage divider comprising resistors 183 and 184 to the bases of transistors 185 and 186. Transistors 185 and 186, operating in the common emitter mode, control transistors 187 and 188, respectively. Transistors 185 and 186 are biased through resistors 189 and 190, respectively. The low level temperature and age characteristics of the base-emitter junctions of transistors 185 and 186 are compensated for by the base-emitter junction of transistor 191, connected in parallel with these junctions.

Transistors 187 and 188 are biased from source 192 through resistors 193 and 194, respectively, and are returned to negative voltage supply 195 through resistors 196 and 197, respectively. The base-emitter junctions of transistors 187 and 188 are compensated for by the base-emitter junction of transistor 198, connected in parallel therewith. The collectors of transistors 185, 186, 187 and 188 are all connected to line 164 to provide the step voltage to gate 58.

The demodulator circuit of FIG. 5 includes a signal reconstruction circuit which is identical to that in the modulator in FIG. 4 and thus, in the absence of transmission errors, reconstructs a virtually identical signal. Since the operation of the modulator is such as to generte pulse signals which reduce the difference between the reconstructed and the input signal, the reconstructed signal from the delta demodulator of FIG. 5 closely tracks the analog input signal to the modulator.

It will be obvious to those of ordinary skill in the art that minor variations are possible for the modulating and demodulating scheme of the present invention without departing from the spirit and scope of this invention.

What is claimed is:

1. A delta modulator comprising
   a comparator,
   a source of input signals to one input of said comparator,
   a source of feedback signals around said comparator to the other input of said comparator,
   a pulse generator for generating an output pulse when said input signal exceeds said feedback signal as determined by said comparator, and
   a feedback circuit utilizing said output pulses to generate said feedback signals, characterized in that
   said feedback circuit includes a syllabic rate integrator having a charging time-constant proportional to syllabic attack times and a discharging time-constant proportional to syllabic decay times.

2. The delta modulator according to claim 1 further characterized in that
   said feedback circuit also includes a non-linear current generator comprising
   a plurality of transistors coupled to said integrator each operating in its linear range of amplification and connected to a common current output lead, and
   resistive biasing means for biasing each of said transistors so as to initiate operation at a different voltage threshold.

3. The delta modulator according to claim 2 wherein the voltage on said syllabic rate integrator controls aid nonlinear current generator.

4. The delta modulator according to claim 2 further characterized in that
   a similar semiconductor junction is connected in parallel with the base-emitter paths of said transistors.

5. The delta modulator according to claim 4 further characterized in that
   at least one of said transistors is driven by the emitter signal on another one of said transistors, and
   two similar semiconductor junctions are connected in parallel with the base-emitter paths of said one transistor and said another one transistor.

6. A delta encoder comprising
   a digitally-controlled feedback circuit, and
   a syllabic rate integrator in said feedback circuit having different charging and discharging time constants, said charging time constant being proportional to syllabic attack time and said discharging time constant being proportional to syllabic decay time.

7. The delta encoder according to claim 6 wherein said discharging time constant is proportional to syllabic decay rates and is independent of the digital control of said feedback circuit.

8. A delta encoder comprising
   a nonlinear companding feedback path,
   a plurality of piecewise-linear semiconductor amplifiers contributing to an overall nonlinear feedback current, and
   resistive biasing means establishing a different threshold of response for each of said semiconductor amplifiers.

9. The delta encoder according to claim 8 wherein said semiconductor amplifiers are temperature-compensated by similar semiconductor junctions in the amplifier control signal path.

10. The delta encoder according to claim 9 wherein said semiconductor amplifiers and said similar semiconductor junctions are fabricated on ths same integrated circuit chip.

11. The delta encoder according to claim 10 wherein said resistive biasing means comprise resistors external to said integrated circuit chip.

12. The method of delta encoding analog input signals comprising the steps of
   1. comparing said input signals to a feedback signal,
   2. generating an output pulse when said input signal exceeds said feedback signal,
   3. generating said feedback signals from said output pulses, and
   4. decaying said feedback signal at a syllabic rate independent of said output pulses.

13. The method of delta encoding according to claim 12 further comprising the steps of
   5. generating nonlinear current pulses as said feedback signals with a plurality of linear semiconductor amplifiers, and
   6. stabilizing the operation of said semiconductor amplifiers with ancillary semiconductor junctions having closely matched ambient-responsive characteristics.

* * * * *